Nov. 1, 1960 R. J. ORRANGE 2,958,813
VELOCITY SERVO SYSTEM ELECTROMECHANICAL INTEGRATOR
Filed June 17, 1958 3 Sheets-Sheet 1

INVENTOR.
Robert J. Orrange

BY Ralph R. Barnard
ATTORNEY

Nov. 1, 1960   R. J. ORRANGE   2,958,813
VELOCITY SERVO SYSTEM ELECTROMECHANICAL INTEGRATOR
Filed June 17, 1958   3 Sheets-Sheet 2

United States Patent Office 2,958,813
Patented Nov. 1, 1960

2,958,813

VELOCITY SERVO SYSTEM ELECTRO-MECHANICAL INTEGRATOR

Robert J. Orrange, Vestal, N.Y., assignor to International Business Machines Corporation, New York, N.Y., a corporation of New York Filed June 17, 1958, Ser. No. 742,522

18 Claims. (Cl. 318—47)

This invention relates to electromechanical drive means and, more particularly, to a new and improved electromechanical integration means.

Integrators have wide application in the analog computer, navigation and automatic control system arts. Such integrators are of the type wherein an electrical voltage is converted to a mechanical rotation with a rotational velocity that is at any given time proportional to the instantaneous value of the voltage and the total shaft rotation of which over an interval of time is proportional to the time integral of the electrical voltage. For example, precision long-range navigational equipment for aircraft often requires the mechanical integration (as a shaft output) of a voltage commensurate with aircraft velocity along its flight path, or along an axis of its reference coordinate system, in order that the instantaneous position of the aircraft be continuously generated.

One of the conventional means for providing such an integration function is known as a velocity or tachometer servo system. This velocity servo may be of either the alternating current or direct current type and ideally might comprise a voltage amplifier energizing an electrical motor with its shaft coupled to an electrical tachometer. The output voltage of the electrical tachometer provides a negative feedback to the voltage amplifier. Provided that the amplifier gain is high, the tachometer will operate at a rotational velocity such that its output voltage is essentially equal and opposite in polarity (or phase) to its input voltage, and the number of revolutions of the shaft will represent the integral of the input voltage. Such an ideal operation is dependent upon a linear relationship between the output voltage of the tachometer and the corresponding rotational velocity at which the tachometer is being driven. As a practical matter, a tachometer with such a relationship presents many design problems, and linear relationships are available only for relatively low rotational velocity ranges of the tachometer. Correspondingly, the high accuracy of the velocity servo system, described herein as including a tachometer, is likewise limited to the same low rotational velocity range.

Along with the general advance of technology, it has become necessary for electromechanical integrators of the velocity servo type to operate at increasingly higher rotational velocities and over wider rotational velocity ranges. For example, the advent of high speed and long distance aircraft has created a need for long-range navigational systems with electromechanical integrators which generate high shaft velocities and with shafts having an instantaneous rotational position which is significant with regard to an instantaneous aircraft position over long time periods representing long distances. If the electromechanical integrator, as described hereinabove, were utilized without regard for the limitations relative to rotational velocity range in a manner such as to provide relatively high percentage errors in the output shaft rotational velocity over long periods of time, the integral of that velocity, represented by the change of rotational position with time, would undoubtely have an even greater percentage error. Moreover, it should be noted that even though the instantaneous error of the rotational velocity of the shaft might be tolerable, the integral of this error over a long period of time, as represented by the erroneous shaft position, might be completely unsatisfactory.

Although the accuracy of electromechanical integrators is constantly being improved by improving each of the components of the integrator, such as the aforementioned rotational velocity-voltage relationship in the tachometer, it would be highly desirable if an electromechanical integrator means could be devised in which the components, such as the conventional or state of the art velocity servos, might be used without the aforementioned rotational velocity range limitations. Accordingly, the present invention teaches means whereby a conventional electromechanical integrator may be incorporated into an integrator system which is operating over a wide range of output shaft velocities while the conventional electromechanical integrator remains within its accurate range. Specifically, a conventional electromechanical integrator is used to drive one shaft input of a mechanical differential and a plural step, constant velocity, electromechanical drive means is connected to the other input. When the conventional integrator has a rotational velocity beyond its accurate range of operation, a known constant shaft velocity input is provided by the aforementioned plural step drive means, and the input voltage to the conventional electromechanical integrator is compensated by a voltage of opposite phase (polarity) commensurate therewith. Thus, the conventional electromechanical integrator need not exceed its selected, linear range of operation.

Although the above technique introduces a number of errors into the system, they are transient in nature in affecting the instantaneous shaft rotational velocity but are not meaningful in terms of an output shaft position representing the integral of the shaft rotational velocity. The nature of these inaccuracies and the basis upon which they are thought to be relatively minor will be set forth hereinafter. It is an important feature of the present invention that the selection of the shaft rotational velocity, at which it is desired that the plural step, electromechanical drive means alter the constant shaft rotational velocity input, is not critical provided the accurate and linear range of operation of the integrator is not exceeded.

It is, therefore, a primary object of the present invention to provide a new and improved electromechanical integrator means.

It is another object of the present invention to provide a new and improved electromechanical integrating means which may operate over a wide range of shaft rotational velocities without exceeding the accurate shaft rotational velocity range of a conventional electromechanical integrator used therein.

It is a further object of the present invention to provide a new and improved means for integrating a voltage commensurate with the velocity of an aircraft in a selected direction in order that its change of position in that direction may be determined.

It is still another object of the present invention to provide a new and improved reversible electromechanical integrating means with a wide shaft rotational velocity range without exceeding the accurate shaft rotational velocity range of a conventional electromechanical integrator used therein.

Other objects of the invention will be pointed out in the following description and claims and illustrated in the accompanying drawings which disclose, by way of examples, the principle of the invention and the best mode which has been contemplated of applying that principle.

In the drawings.

While the present invention will be described using alternating current techniques, it should be obvious that it is equally applicable to direct current techniques. Moreover, identical components shown in more than one of the figures will have identical reference numerals.

Figure 1:
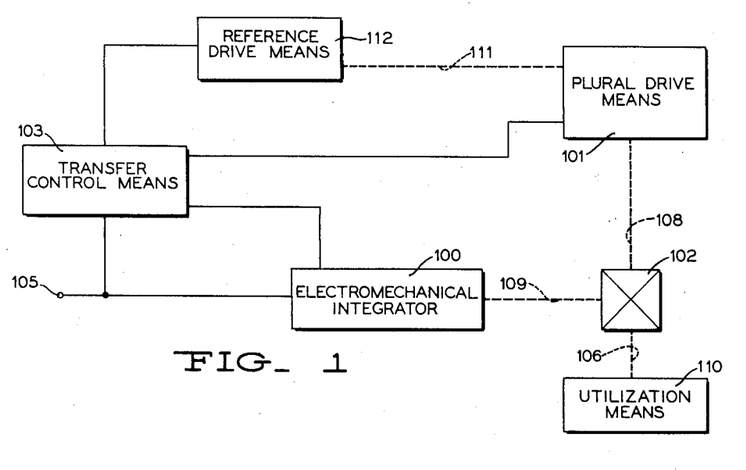
Fig. 1 is an over-all block diagram illustrating an embodiment of the present invention.

Briefly, this invention teaches a new and improved electromechanical integration means responsive to a voltage commensurate with a velocity to be measured for providing an accurate integrated shaft position over a wide range of shaft rotational velocities. Referring to Fig. 1, reversible conventional electromechanical integrator 100 is arranged to be responsive to an input voltage applied to input terminal 105 commensurate with the instantaneous velocity to be integrated. The output of integrator 100, by way of shaft 109, serves as one of the inputs to mechanical differential 102. Connected to the other input of mechanical differential 102 is a reversible plural electromechanical drive means 101 which, as will be described hereinafter, cooperates with conventional integrator 100 so that the latter continuously operates in a selected range where the relationship between its input voltage and output shaft velocity is linear and accurate, while the output shaft 106 of differential 102 varies over a wide range of shaft velocities. Transfer control means 103, which is also connected to be responsive to the input voltage appearing at terminal 105 commensurate with the instantaneous velocity to be integrated, is utilized for detecting when the input velocity passes outside the selected linear operating range of the conventional integrator 100 for actuating the reversible plural step drive means 101 so as to provide a known constant shaft velocity input to mechanical differential 102. Means 103 also functions to provide for a compensating voltage input to conventional integrator 100 in order that the algebraic sum of the input voltage thereto be modified by an amount commensurate with the shaft velocity contribution being made by the reversible plural step drive means 101 to differential 102 via shaft 108. Thus, as the rotational velocity of integrating output shaft 106 increases successively through the selected range of linear operation of the conventional electromechanical integrator 100, this fact is detected by means 103 and the mechanical differential input from plural step drive means 101. Simultaneously, the compensating voltage applied to conventional integrator 100 is appropriately adjusted. The output shaft 106 from mechanical differential 102 may be connected, as shown, to a utilization means 110 which, by way of example, may comprise either a potentiometer, a revolution counter, or both.

The electromechanical plural step drive means 101 with a single output shaft 108 will be described in detail in connection with Fig. 2 hereinafter. Generally, however, it is a simple arrangement of a plurality of electrically actuated clutches and mechanical differentials that modify the rotational velocity of shaft 111, which is driven by a constant speed electromechanical drive means 112, to provide plural rotational velocities for shaft 108. The choice of the number of different constant shaft rotational velocity outputs from electromechanical device 101 is determined by the magnitude of the speed range over which the output shaft 106 is expected to operate. Moreover, the lowest rotational velocity step provided should be selected as twice the range over which it is desired to have the conventional electromechanical integrator 100 operate. Further, on the basis that any combination of the additional rotational velocity steps may drive shaft 108 at one time, the rotational velocities of these steps may be selected as powers of two times the lowest rotational velocity step. The significance of these rotational velocity design considerations will be made clear as the description proceeds.

Although the reference drive means 112 will be described hereinafter in connection with Fig. 2 as a synchronous motor energized by an A.C. source which is designed to have a highly accurate frequency, there are many equivalent drive means available in the art. The reference drive means 112 is shown as being responsive to transfer control means 103, which is in turn responsive to the input voltage commensurate with the instantaneous velocity to be integrated appearing at terminal 105. This feature is intended to assure that the embodiment of the present invention being described is reversibly responsive to the phase or polarity of the input voltage, as will be described in detail hereinafter.

Figure 2:
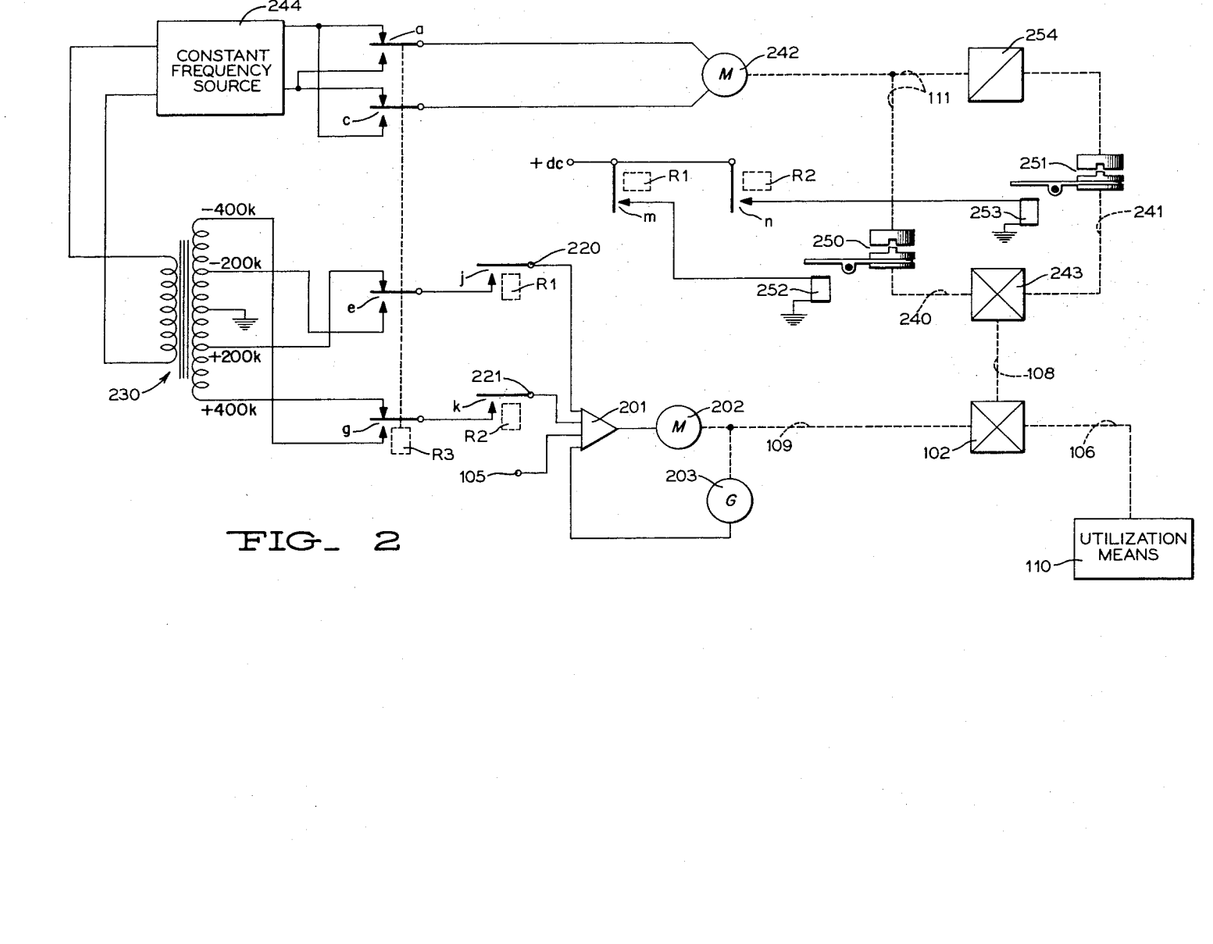
Fig. 2 is a schematic showing in more detailed form of the embodiment of the present invention shown in Fig. 1 without including means for detecting the transfer points at which the contribution to the output shaft rotational velocity by the plural step constant velocity drive means is altered.

Referring now to Fig. 2, the conventional electromechanical integrator is illustrated as comprising an amplifier 201, electrical motor 202 and tachometer 203 connected as shown. Thus, an input voltage commensurate with the instantaneous velocity to be integrated may be applied to the input of amplifier 201 via terminal 105 in order that motor 202 be energized in accordance with the magnitude and phase (polarity) of the amplifier output voltage. As a result, shaft 109 is driven by electrical motor 202 and provides a shaft rotational velocity input to mechanical differential 102. In order that the relationship between the input voltage appearing at terminal 105 and the rotational shaft velocity 109 be linear, the gain of amplifier 201 is made high and the output voltage of tachometer 203 (also driven by shaft 109) is connected to provide a negative feedback to amplifier 201. The linear relationship sought is also dependent on a linear relationship between the output voltage of tachometer 203 and the rotational velocity at which it is driven. However, as a practical matter, it is difficult to build a tachometer having a linear relationship between the output voltage and rotational velocity except over a limited range of shaft rotational velocities. Therefore, when it is desired that the conventional electromechanical integrator not be subject to non-linearity errors, it must be utilized in an equipment environment where a smaller rotational velocity range may be tolerated.

For the purpose of describing the operation of the exemplary embodiment of the present invention set forth herein, consider that a conventional tachometer type electromechanical integrator is available which will provide a substantially linear shaft rotational velocity output in response to an input voltage commensurate with an aircraft velocity of zero to 100 knots. The present invention provides means for utilizing this conventional electromechanical integrator to provide a shaft position integration over a much larger range of rotational velocities by incorporating the conventional electromechanical integrator in a system where its linear range of operation is never exceeded. By following the design suggestions set forth hereinabove, and remembering that it is desired that the conventional electromechanical integrator providing the input to mechanical differential 102 via shaft 109 be limited to a rotational velocity commensurate with 100 knots, shaft 108 representing the other input to mechanical differential 102 may be designed to provide a rotational velocity input commensurate with either 200 knots via shaft 240 and mechanical differential 243, 400 knots via shaft 241 and differential 243, or their sum representing 600 knots.

As shown in Fig. 2, shafts 240 and 241 are selectively driven by an electrical synchronous motor 242 which, in turn, is energized by an accurately controlled constant frequency electrical power source 244. Shaft 240 is shown connected to electrical motor 242 via electrically actuated clutch 250, while shaft 241 is shown connected to electrical motor 242 via electrically actuated clutch 251 and the mechanical gearing 254. Gearing 254 is selected so that when the rotational velocity output of motor 242 is commensurate with 200 knots, a shaft rotational velocity conversion commensurate with 400 knots results. Thus, if the clutch 250 is actuated by clutch solenoid 252 and clutch 251 is not actuated, shaft 108 is driven at a rotational velocity commensurate with 200 knots. Alternatively, if clutch 251 is actuated by clutch solenoid 253 and clutch 250 is not actuated, shaft 108 is driven at a rotational velocity commensurate with 400 knots. If both clutch 250 and clutch 251 are respectively actuated by clutch solenoids 252 and 253 simultaneously, shaft 108 is driven at a rotational velocity commensurate with 600 knots (200+400).

Corresponding to the plural step rotational shaft velocities commensurate with 200, 400 and 600 knots which, by way of example, may be available at shaft 108, plural equivalent compensating voltages may be provided as inputs to amplifier 201 so as to appropriately modify the algebraic sum of the voltage input thereto. Thus, by a plural tapped transformer and a switching relay contact combination, which will be described in more detail hereinafter, amplifier 201 may be selectively connected to receive an input voltage commensurate with 200 knots via terminal 220, a compensating voltage commensurate with 400 knots via terminal 221, or a total voltage commensurate with 600 knots via both terminals 220 and 221.

As already indicated hereinabove, it is the fundamental feature of the present invention that the shaft rotational velocity contribution of shaft 108 to mechanical differential 102 is modified whenever the output shaft 109 of the conventional electromechanical integrator exceeds the selected operating range exemplified by a rotational velocity commensurate with about 100 knots, while a corresponding and compensating voltage input commensurate with the particular rotational velocity step of shaft 108 is applied to the input of amplifier 201.

Figure 4:
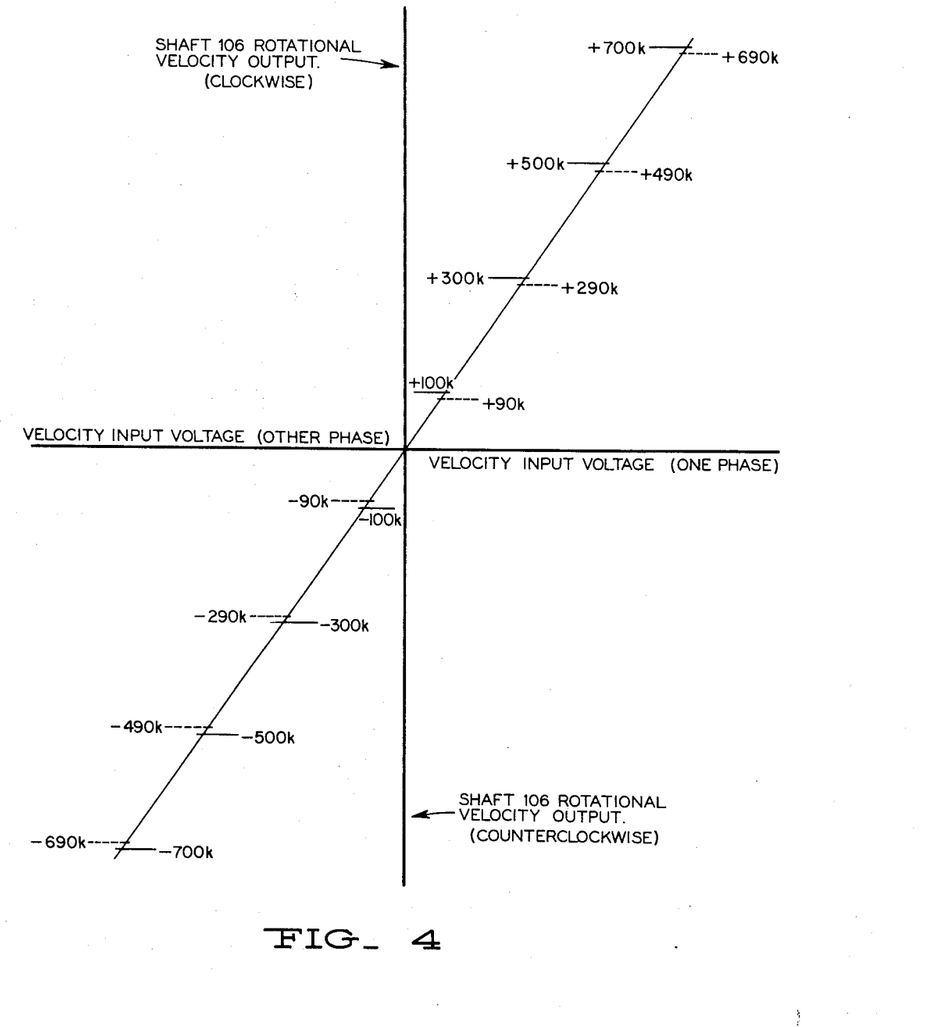
Fig. 4 is a plot of the output shaft rotational velocity of an exemplary electromechanical integration means according to the present invention versus the input voltage commensurate with the velocity being integrated to graphically illustrate the transfer points detected by the switching means of Fig. 3.

Referring now to Fig. 4, there is shown a graphic illustration of the operation of the integration means of the present invention as represented by a plot of the rotational velocity output of shaft 106 (representing the output of differential 102) on the ordinate versus the input voltage applied at terminal 105 (representing the velocity to be integrated) on the abscissa. Since the embodiment of the present invention shown is reversible and responsive to input voltages of either one phase or another, the plot is shown in both the first and third quadrants. For purposes of the present illustration, the rotational velocity output of shaft 106 may be considered to be clockwise for an input voltage with one phase and counterclockwise for an input voltage of the other phase. Considering a continuously increasing input voltage commensurate with the rotational velocity to be integrated, the disclosed embodiment of the present invention has been described as operating the conventional electromechanical integrator successively over its selected linear range of operation, while shaft 106 passes between operating points commensurate with rotational velocities of 100, 300, 500 and 700 knots. In Fig. 4, operating points known as Make points are shown by short-solid lines. These Make points represent the rotational velocity at which the contribution to the shaft rotational velocity output of mechanical differential 102 is modified by one of the constant step rotational velocity inputs via shaft 108. Since it is possible that the input voltage applied via terminal 105 will hover near one of these operating points, the step contribution made by shaft 108 and the compensating voltages being applied to amplifier 201 in parallel with the input voltage applied at terminal 105 might be continuously modified, thereby providing an undesirable chatter or oscillation in the system. For this reason, a difference of approximately 10 knots may be selected between the operating points known as Make points for increasing input voltages commensurate with the rotational velocity to be integrated and the operating points known as Break points for decreasing input voltages. When Make points are selected at 100, 300 and 500 knots, as in the present embodiment, corresponding Break points may, by way of example, be selected at 90, 290 and 490 knots. In Fig. 4, these Break points are shown for input voltages of both phases by short-dashed lines. It should be emphasized, however, that the actual operating point at which the contribution made via shaft 108 is transferred from one step to the other is not critical as long as the conventional electromechanical integrator operates within its selected linear range.

Figure 3:
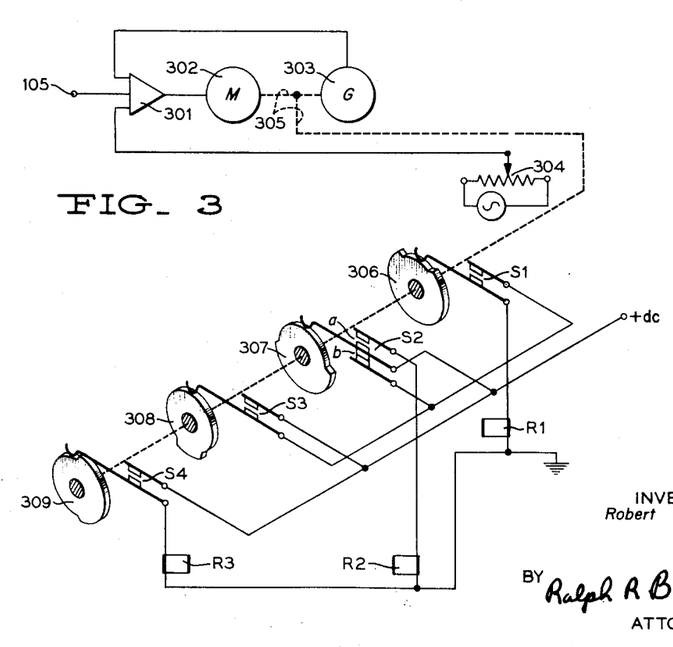
Fig. 3 is a schematic diagram showing a preferred embodiment of a means for detecting the transfer points at which the contribution to the output shaft rotational velocity of the plural step constant velocity drive means is altered.

Referring now to Fig. 3, there is shown a means for detecting the operating points (Make and Break) which are graphically shown in Fig. 4. Because of the reversible operation desired, detection means must provide for the determination of the operating points in both the first and third quadrants of Fig. 4. In Fig. 3, a conventional position servo is shown receiving an input via the aforementioned terminal 105 in order to provide a shaft position commensurate with the instantaneous input voltage representing the velocity to be integrated. This conventional electrical position servo is shown as comprising an amplifier 301 connected to terminal 105 for energizing electrical motor 302 so as to rotate a shaft 305 in a direction and amount commensurate with the magnitude and phase of the input voltage. Shaft 305 functions to drive conventional damping tachometer 303 and to position the wiper of follow-up potentiometer 304. Potentiometer 304 provides a voltage input to amplifier 301 in phase opposition to appropriately null out the input voltage to terminal 105 when the output shaft position is commensurate therewith. When the input voltage at terminal 105 is of one phase, shaft 305 rotates in one direction, and when the input voltage is of the other phase, shaft 305 rotates in the other direction. Cams 306, 307, 308 and 309 are shown connected to shaft 305.

Cam 306 is shown as having a raised portion on its periphery appropriately positioned to close switch S1 when shaft 305 is angularly positioned clockwise or counterclockwise in accordance with an input voltage representing an aircraft velocity of ±100 knots or more. Cam 307 is shown with a raised portion on its periphery in order that it may close switch S2a whenever shaft 305 is angularly positioned clockwise or counterclockwise in accordance with an input voltage representing an aircraft velocity of ±300 knots or more. Cam 308 is shown with a raised portion on its periphery in order that it may close switch S3 whenever shaft 305 is angularly positioned clockwise or counterclockwise in accordance with an input voltage representing an aircraft velocity of ±500 knots or more. Because it is desired that the Make and Break points detected by cams 306, 307 and 308 be approximately 10 knots apart, the switches actuated by each may be of the well known micro-switch type which have separate Make and Break points. By way of example, a micro-switch known as type number V3–1 and which is manufactured by Minneapolis-Honeywell Regulator Co., Minneapolis, Minnesota, operates in this manner.

Cam 309 is shown with a raised portion on its periphery in order that it may close switch S4 whenever shaft 305 is angularly positioned clockwise (when looking down the shaft 305 from motor 302 in Fig. 3) commensurate with an input voltage representing a clockwise rotational velocity to be integrated, thereby providing a means for detecting whether the disclosed embodiment of the present invention is operating in either the first quadrant or the third quadrant of the plot of Fig. 4. Whenever switch S4 is closed by cam 309, a reversing relay R3 is energized by a D.C. source as shown. Depending on its condition of energization, reversing relay R3 determines the phase of the compensating voltages which may be applied to the conventional electromechanical integrator and the phase of the input voltage for motor 242. This allows the disclosed embodiment of the present invention to operate in both the first and third quadrants of the plot shown in Fig. 4. When shaft 105 is rotated clockwise, cam 309 closes switch S4 and energizes reversing relay R3. On the other hand, if shaft 305 were to rotate cam 309 in the other direction, switch S4 remains open and reversing relay R3 remains de-energized.

In order to provide a constant step rotational velocity input to mechanical differential 102 via shaft 108, a mechanical differential and an electrically actuated clutch combination driven by motor 242 is utilized. Whenever it is desired that the shaft 108 rotational velocity contribution be reversed, means including double throw relay contacts R3a and R3c are provided. These contacts reverse the phase of the constant frequency source 244 energization to synchronous motor 242 when reversing relay R3 is energized.

In Fig. 2, the primary of a transformer 230 is connected to the constant frequency source 244. The secondary of transformer 230 contains plural taps including a grounded center tap. The other taps provide plural step voltages according to the rotational velocity steps provided by shaft 108. Based on the exemplary operation of the disclosed embodiment of the present invention, the voltage steps provided by transformer 230 are shown to be of a magnitude and phase to represent +400 knots, +200 knots, −200 knots and −400 knots. In this fashion, terminals 220 and 221 can be provided with either −200 knots and −400 knots, respectively, or +200 knots and +400 knots, respectively. Selection is afforded by relay contacts R3e and R3g.

Referring again to Fig. 3, as cam 306 is rotated either clockwise or counterclockwise by shaft 305 so that switch S1 is closed, the D.C. control voltage source shown is applied through switches S2b and S1 and through the coil of relay R1 to ground, thereby detecting that shaft 305 is positioned commensurate with a Make point representing +100 knots. Upon energization, relay R1 acts to close relay contact R1m which, in turn, causes a D.C. control voltage to energize clutch solenoid 252 and causes clutch 250 to connect shafts 111 and 240. Thus, shaft 108 contributes a rotational velocity input to mechanical differential 102 commensurate with +200 knots. Following energization, relay R1 also acts to close relay contact R1j, thereby applying a compensating voltage commensurate with either +200 knots or −200 knots to the input of the conventional electromechanical integrator via terminal 220. Whenever shaft 108 contributes a rotational velocity commensurate with +200 knots, the compensating voltage applied to the input of the conventional electromechanical integrator is commensurate with −200 knots, or vice versa. As indicated above, it is the condition of the reversing relay R3 which determines the directional characteristic of the contribution made by shaft 108.

As cam 307 is rotated either clockwise or counterclockwise by shaft 305 so that switch S2a is closed and switch S2b is open, the D.C. control voltage source shown is applied through switch S2a to ground, thereby energizing relay R2 and detecting that shaft 305 is positioned commensurate with a Make point representing ±300 knots. Although switch S1 remains closed, the opening of switch S2b acts to de-energize relay R1 and disengage clutch 250. Following energization, relay R2 acts to close relay contact R2n which, in turn, causes a D.C. control voltage to energize clutch solenoid 253, thereby selectively engaging clutch 251 so that shaft 108 contributes a rotational velocity input to mechanical differential 102 commensurate with ±400 knots. Following energization, relay R2 also acts to close relay contact R2k, thereby applying a compensating voltage commensurate with either +400 knots or −400 knots to the input of the conventional electromechanical integrator via terminal 221. Whenever shaft 108 contributes a rotational velocity commensurate with +400 knots, the compensating voltage applied to the input of the conventional electromechanical integrator is commensurate with −400 knots, or vice versa, as determined by the condition of reversing relay R3.

When cam 308 is rotated either clockwise or counterclockwise by shaft 305 so that switch S3 is closed, the D.C. control voltage source shown is applied through closed switch S3 and previously closed switch S1 to ground, thereby energizing relay R1 and detecting that shaft 305 is positioned commensurate with a Make point representing ±600 knots. It should be noted that switch S1 has remained closed since shaft 305 passed through the Make point representing ±100 knots. As a result of the simultaneous energization of both relays R1 and R2, both relay contacts R1n and R2m are closed and both solenoids 252 and 253 are energized so that both clutches 250 and 251 are simultaneously engaged. Because of such simultaneous engagement, mechanical differential 243 contributes a rotational velocity input to mechanical differential 102 via shaft 108 commensurate with ±600 knots. The simultaneous energization of relays R1 and R2 also acts to close both relay contacts R1j and R2k, thereby applying a compensating voltage commensurate with ±200 knots to the input of the conventional electromechanical integrator via terminal 220 and a compensating voltage with ±400 knots to the input of the conventional electromechanical integrator via terminal 221. Whenever shaft 108 contributes a rotational velocity commensurate with +600 knots, the compensating voltage applied to the input of the conventional electromechanical integrator is commensurate with −600 knots, or vice versa, depending on the condition of reversing relay R3.

In Fig. 2, utilization means 110 is shown receiving a rotational velocity input from mechanical differential 102 via shaft 106. As indicated above, this utilization means may, by way of example, comprise a multi-turn potentiometer, the wiper (or stator) of which is being positioned by shaft 106; a rotational counting means counting the revolutions of shaft 106; or both. When the present invention is applied to a navigational system, the shaft position of shaft 106 may be utilized to represent an actual or simulated change of position of the vehicle in which it is mounted with respect to a reference, while the rotational velocity of shaft 106 may be commensurate with the actual or simulated velocity of that vehicle.

To provide a better understanding of the present invention and its reversible nature, a sequence of operation will be described where the input voltage of one phase varies in magnitude commensurate with a velocity to be integrated from zero to +700 knots and back to zero knots. This is followed by a sequence where the input voltage reverses its phase and varies in magnitude from a magnitude corresponding to zero knots to −700 knots and back to zero knots. Considering a voltage of one phase being applied to terminal 105 of Fig. 2 and Fig. 3 as increasing in magnitude from 0 to +100 knots, the conventional electromechanical integrator causes shaft 109 to be rotated with a velocity commensurate with that voltage, and the accumulative position of shaft 109 is maintained equal to the integral of that voltage in a manner such that no errors are produced because of non-linearities in the conventional integrator. Because shaft 108 is not providing a shaft rotational velocity input to mechanical differential 102, shafts 109 and 106 rotate in synchronism. When the voltage at input terminal 105 has reached a magnitude representing a velocity to be integrated commensurate with +100 knots, the conventional electrical position servo of Fig. 3 will drive shaft 305 to a position so that cam 306 closes switch S1, thereby energizing relay R1. As a result of the energization of relay R1, relay contact R1m is closed, and solenoid 252 causes clutch 250 to be selectively engaged. Whenever clutch 250 is engaged, motor 242 is designed to contribute a rotational velocity to shaft 108 via shaft 240 commensurate with +200 knots. Relay R1 also closes relay contact R1j and applies a compensating voltage commensurate with −200 knots to be applied to the conventional electromechanical integrator via terminal 220 so that the algebraic sum of the input voltage applied thereto is instantaneously commensurate with −100 knots. Hence, the direction of rotation of shaft 109 is instantaneously reversed, and the output shaft 106 of mechanical differential 102 has a net rotational velocity representing +100 knots.

Moreover, as the voltage of one phase being applied to terminal 105 of Fig. 2 and Fig. 3 continues to increase, the algebraic sum of the input voltage applied to amplifier 201 will change from −100 knots through a zero magnitude toward a magnitude commensurate with +100 knots, while the rotational velocity of output shaft 106 from differential 102 varies from a magnitude commensurate with +100 knots up to a magnitude commensurate with +300 knots. At that time, the fact that the selected operating range of the conventional electromechanical integrator is about to be exceeded will be detected because the position servo in Fig. 3 will drive shaft 305 to a position so that cam 307 closes switch S2a, thereby energizing relay R2. Simultaneously, relay R1 is de-energized by the opening of switch S1b.

As a result of the energization of relay R2, relay contact R2n is closed and solenoid 253 causes clutch 251 to be selectively engaged. Whenever clutch 251 is engaged, synchronous motor 242 is designed to contribute a rotational velocity to shaft 108 via shaft 241 commensurate with +400 knots. Simultaneously, relay R2 also closes relay contact R2k and applies a compensating voltage commensurate with −400 knots to the input of amplifier 201 via terminal 221 in phase opposition to the instantaneous input voltage being applied to input terminal 105 commensurate with +300 knots so that the algebraic sum thereof is equal to −100 knots, thereby reversing the energization of motor 202 so that output shaft 109 reverses and rotates in the opposite direction at a rotational velocity commensurate with −100 knots. As a result, shaft 106 continues to rotate at a velocity commensurate with +300 knots. Moreover, if the input voltage of one phase applied to terminal 105 continues to increase, the algebraic sum of the input voltage applied to amplifier 201 changes from a magnitude commensurate with −100 knots through a zero magnitude toward a magnitude commensurate with +100 knots, while the rotational velocity of output shaft 106 from differential 102 varies from a magnitude commensurate with +300 knots up to +500 knots.

At that time, the fact that the operating range of the conventional electromechanical integrator including amplifier 201 is about to be exceeded will be detected because cam 308 of Fig. 3, driven by shaft 305, will close switch S3, thereby re-energizing relay R1 in addition to relay R2. As a result of the energization of both relays R1 and R2, both clutch 250 and clutch 251 will be engaged and motor 242 will contribute a total rotational velocity to shaft 108 via shafts 240 and 241 commensurate with +600 knots. Simultaneously energized relays R1 and R2 (which in turn close relay contacts R1j and R1k) cause a total compensating voltage commensurate with −600 knots to be applied to summing amplifier 201 via terminals 220 and 221 so that the algebraic sum of the input voltage is again instantaneously commensurate with −100 knots, thereby reversing the energization of electric motor 202. Accordingly, electric motor 202 reverses and output shaft 109 rotates in an opposite direction at a rotational velocity commensurate with −100 knots. As a result, output shaft 106 of differential 102 continues to rotate at a velocity commensurate with +500 knots.

As the input voltage of one phase applied to terminal 105 continues to increase, the algebraic sum of the input voltage applied to amplifier 201 will change from a magnitude commensurate with −100 knots through a zero magnitude toward a magnitude commensurate with +100 knots, while the rotational velocity of output shaft 106 from mechanical differential 102 varies from a magnitude commensurate with +500 knots up to +700 knots.

If the input voltage appearing at terminal 105 then commences to decrease, the rotational velocity of output shaft 106 from differential 102 will vary from a magnitude commensurate with +700 knots down to +490 knots, while the algebraic sum of the input voltage applied to amplifier 201 will vary from a magnitude commensurate with +100 knots through a zero magnitude down to a magnitude commensurate with −110 knots. It should be noted that the maximum range of rotational velocities over which the conventional electromechanical integrator needs to operate are those commensurate with velocities to be integrated from about 0 to ±110 knots. The fact that the operating range of the conventional electromechanical integrator is about to be exceeded (as exemplified by the Break point commensurate with +490 knots as shown in Fig. 4) will be detected when cam 308 (Fig. 3) opens switch S3. As a result of opening switch S3, relay R1 will be de-energized and relay R2 will remain energized. As indicated above, whenever relay R2 is energized, clutch 251 is engaged and motor 242 contributes a rotational velocity to shaft 108 via shaft 241 commensurate with +400 knots. Energized relay R2 will also cause a compensating voltage commensurate with −400 knots to be applied to the input of amplifier 201 via terminal 221 in phase opposition to the instantaneous input voltage being applied via terminal 105 commensurate with +490 knots such that the algebraic sum thereof is equal to +90 knots. As a result, shaft 106 continues to rotate at a velocity commensurate with +490 knots. Moreover, if the input voltage applied to terminal 105 continues to decrease, the algebraic sum of the input voltage of said one phase applied to amplifier 201 will change from a magnitude commensurate with +90 knots through a zero magnitude toward a magnitude commensurate with −110 knots, while the rotational velocity output shaft 106 from differential 102 varies from a magnitude commensurate with +490 knots to +290 knots.

When shaft 102 has a rotational velocity commensurate with +290 knots, the operating range of the conventional electromechanical integrator is about to be exceeded, as exemplified by the Break point at +290k in Fig. 4. This fact is detected by cam 307 (Fig. 3) opening switch S2a and closing switch S2b so that relay R2 is de-energized, while relay R1 is re-energized. As a result of the selective energization of relay R1, clutch 250 is engaged and motor 242 contributes a rotational velocity to shaft 108 via shaft 240 commensurate with +200 knots. Relay R1 also closes relay contact R1j such that a compensating voltage commensurate with −200 knots is applied to the input of amplifier 201 via terminal 220 in phase opposition to the instantaneous input voltage being applied via terminal 105 commensurate with +290 knots such that the algebraic sum thereof is commensurate with +90 knots. Accordingly, the electric motor 202 driving output shaft 109 reverses and rotates at a rotational velocity commensurate with +90 knots. As a result, shaft 106 continues to rotate at a velocity commensurate with +290 knots. If the input voltage applied to terminal 105 continues to decrease, the algebraic sum of the input voltage applied to amplifier 201 will change from a magnitude commensurate with +90 knots through a zero magnitude toward a magnitude commensurate with −110 knots, while the rotational velocity of output shaft 106 from differential 102 varies from a magnitude commensurate with +290 knots to +90 knots.

The fact that the operating range of the conventional electromechanical integrator is about to be exceeded (as exemplified by the Break point commensurate with +90 knots, as shown in Fig. 4) will be detected by cam 306 (Fig. 3) opening switch S1. As a result of the opening of switch S1, relay R1 will be de-energized, and clutch 250 will be disengaged. The motor 242 will no longer contribute a rotational velocity to shaft 108. When relay R1 is de-energized, a compensating voltage commensurate with −200 knots will no longer be applied to amplifier 201 via terminal 220, and the input voltage applied thereto will be commensurate with +90 knots. If the input voltage applied to terminal 105 continues to decrease, the rotational velocity of shaft 109 and the output shaft 106 from differential 102 will vary from a magnitude commensurate with +90 knots down to zero knots.

Considering a voltage of the other phase being applied to terminal 105 of Figs. 2 and 3 as increasing in magnitude from zero to −100 knots, the conventional electromechanical integrator causes shaft 109 to be rotated with a velocity commensurate with that voltage, and the accumulative position of shaft 109 is maintained equal to the integral of that voltage in a manner such that no errors are produced because of non-linearities in the conventional integrator. Because shaft 108 is not providing a shaft rotational velocity input to mechanical differential 102, shafts 109 and 106 rotate in synchronism. Further, since the input voltage being applied to terminal 105 is of such a phase that the conventional position servo of Fig. 3 will rotate shaft 305 counterclockwise, switch S4 is never actuated, and relay R3 is not energized. As a result, relay contacts R3a and R3c remain connected to the output of constant frequency power supply 244 and relay contacts R3e and R3g connected to the tapped outputs of transformer 220 remain in the condition shown in Fig. 2.

When the voltage at input terminal 105 has reached a magnitude representing a velocity to be integrated commensurate with −100 knots, the conventional electrical position servo of Fig. 3 will drive shaft 305 to a position so that cam 306 closes switch S1, thereby energizing relay R1. As a result of the energization of relay R1, relay contact R1m closes and solenoid 252 causes clutch 250 to be selectively engaged. Whenever clutch 250 is engaged, motor 242 is designed to contribute a rotational velocity to shaft 108 via shaft 240 commensurate with −200 knots (relay R3 remaining de-energized). Relay R1 also closes relay contact R1j and applies a compensating voltage commensurate with +200 knots to be applied to the conventional electromechanical integrator via terminal 220 so that the algebraic sum of the input voltage applied thereto is instantaneously commensurate with +100 knots. Hence, the rotational velocity of shaft 109 is instantaneously reversed, and the output shaft 106 of mechanical differential 102 is maintained at a net rotational velocity representing a velocity to be detected equal to 100 knots.

As the voltage of the aforementioned other phase being applied to terminal 105 of Fig. 2 and Fig. 3 continues to increase, the algebraic sum of the input voltage applied to amplifier 201 will change from a magnitude commensurate with −100 knots through a zero magnitude toward a magnitude commensurate with +100 knots, while the rotational velocity of output shaft 106 from differential 102 varies from a magnitude commensurate with −100 knots up to a magnitude commensurate with −300 knots. At that time, the fact that the operating range of the conventional electromechanical integrator is about to be exceeded will be detected because the position servo of Fig. 3 will drive shaft 305 to a position so that cam 307 closes switch S2a, thereby energizing relay R2. Simultaneously, relay R1 is de-energized by the opening of switch S1b. As a result of the energization of relay R2, relay contact R2n closes and solenoid 253 causes clutch 251 to be selectively engaged.

Whenever clutch 251 is engaged, synchronous motor 242 is designed to contribute a rotational velocity to shaft 108 via shaft 241 commensurate with −400 knots (reversing relay R3 de-energized). Simultaneously, relay R2 also closes relay contact R2k and applies a compensating voltage commensurate with +400 knots to the input of amplifier 201 via terminal 222 in phase opposition to the input voltage being applied to input terminal 105 commensurate with −300 knots so that the algebraic sum thereof is equal to +100 knots, thereby reversing the energization of motor 202 so that output shaft 109 reverses and rotates in the opposite direction at a rotational velocity commensurate with +100 knots.

As a result, shaft 106 continues to rotate at a velocity commensurate with −300 knots. If the input voltage of the other phase being applied to terminal 105 continues to increase, the algebraic sum of the input voltage applied to amplifier 201 will change in magnitude commensurate with +100 knots through a zero magnitude toward a magnitude commensurate with −100 knots, while the rotational velocity of output shaft 106 from differential 102 varies from a magnitude commensurate with −300 knots up to −500 knots.

At that time, the operating range of the conventional electromechanical integrator, including amplifier 201, is about to be exceeded, and cam 308 of Fig. 3 will close switch S3, thereby re-energizing relay R1 in addition to relay R2. As a result, clutches 250 and 251 will be engaged and motor 242 will contribute a total rotational velocity to shaft 108 via shafts 240 and 241 commensurate with −600 knots. Simultaneously energized relays R1 and R2 (which in turn close relay contacts R1j and R1k) cause a total compensating voltage commensurate with +600 knots to be applied to summing amplifier 201 via terminals 220 and 221 so that the algebraic sum of the input voltage is again instantaneously commensurate with +100 knots, thereby reversing the energization of electrical motor 202. Electric motor 202 reverses and output shaft 109 rotates in an opposite direction at a rotational velocity commensurate with +100 knots. As a result, shaft output 106 of differential 102 continues to rotate at a velocity commensurate with −500 knots. As the input voltage of the other phase applied to terminal 105 continues to increase, the algebraic sum of the input voltage applied to amplifier 201 will change from a magnitude commensurate with +100 knots through a zero magnitude toward a magnitude commensurate with −100 knots, while the rotational velocity of shaft 106 from mechanical differential 102 varies from a magnitude commensurate with −500 knots up to −700 knots.

If the input voltage appearing at terminal 105 now commences to decrease, the rotational velocity of output shaft 106 from differential 102 will vary from a magnitude commensurate with −700 knots down to −490 knots, while the algebraic sum of the input voltage applied to amplifier 201 will vary from a magnitude commensurate with −100 knots through a zero magnitude down to a magnitude commensurate with +110 knots. The fact that the operating range of the conventional electromechanical integrator is about to be exceeded (as exemplified by the Break point commensurate with −490 knots as shown in Fig. 4) will be detected by cam 308 (Fig. 3) opening switch S3. As a result of opening switch S3, relay R1 will be de-energized and relay R2 will remain energized. Clutch 251 remains engaged and motor 242 contributes a rotational velocity to shaft 108 via shaft 241 commensurate with −400 knots. Relay R2 will also cause a compensating voltage commensurate with +400 knots to be applied to the input of amplifier 201 via terminal 221 in phase opposition to the instantaneous input voltage being applied via terminal 105 commensurate with −490 knots such that the algebraic sum thereof is equal to −90 knots. As a result, shaft 106 continues to rotate at a velocity commensurate with −490 knots. If the input voltage applied to terminal 105 continues to decrease, the algebraic sum of the input voltage of the other phase applied to amplifier 201 will change from a magnitude commensurate with −90 knots through a zero magnitude toward a magnitude commensurate with +110 knots, while the rotational velocity output shaft 106 from differential 102 varies from a magnitude commensurate with −490 knots to −290 knots.

When the rotational velocity is commensurate with 290 knots, the operating range of the conventional electromechanical integrator is about to be exceeded, as exemplified by the Break point of Fig. 4 commensurate with −290 knots. This fact is detected as cam 307 (Fig. 3) opens switch S2a and closes switch S2b so that relay R2 is de-energized and relay R1 is re-energized. As a result of the energization of relay R1, clutch 250 is engaged and motor 242 contributes a rotational velocity to shaft 108 via shaft 240 commensurate with −200 knots. Relay R1 also closes relay contact R1j such that a compensating voltage commensurate with +200 knots is applied to the input of amplifier 201 via terminal 220 in phase opposition to the instantaneous input voltage being applied via terminal 105 commensurate with −290 knots so that the algebraic sum thereof is commensurate with −90 knots. Accordingly, the electric motor 202 driving output shaft 109 reverses and rotates at a rotational velocity commensurate with −90 knots. As a result, shaft 106 continues to rotate at a velocity commensurate with −290 knots.

If the input voltage applied to terminal 105 continues to decrease, the algebraic sum of the input voltage applied to amplifier 201 will change from a magnitude commensurate with −90 knots through a zero magnitude toward a magnitude commensurate with +110 knots, and the rotational velocity of output shaft 106 from differential 102 will vary from a magnitude commensurate with −290 knots to −90 knots.

The fact that the operating range of the conventional electromechanical integrator is about to be exceeded (as exemplified by the Break point commensurate with −90 knots, as shown in Fig. 4) will be detected as cam 306 (Fig. 3) opens switch S1. This de-energizes relay R1 so that clutch 250 is disengaged. The motor 242 will no longer contribute a rotational velocity to shaft 108. With relay R1 de-energized, a compensating voltage commensurate with +200 knots is no longer applied to amplifier 201 via terminal 220, and the input voltage applied thereto will be commensurate with −90 knots. If the input voltage applied to terminal 105 continues to decrease, the rotational velocity of shaft 109 and the output shaft 106 from differential 102 will vary from a magnitude commensurate with −90 knots to zero knots.

As a result of the fact that the conventional velocity integrator is never used for rotational velocities outside its linear range, the accuracy of the total system is inherently increased. Using the disclosed embodiment as an example, if the conventional velocity integrator utilized therein has a proportional error amounting to a small percentage of the input voltage over a speed range representing from zero to slightly greater than 100 knots (110 knots), its use, according to the present invention, over a speed range representing zero to 700 knots will result in a percentage error of the input voltage of about only one-seventh as large. It should be noted, however, that a small error will be introduced each time an operating point (either Make or Break) is reached, and the conventional velocity integrator must change from its maximum rotational velocity in one direction to a maximum rotational velocity in the other direction, while the constant rotational velocity step input to mechanical differential 102 is being altered. Since this error is of a transient nature, it will result in a very small accumulative error in the integrated shaft output of mechanical differential 102.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electromechanical integrator means operable over a wide range of output shaft rotational velocities comprising means for providing an input voltage commensurate with the instantaneous input velocity to be integrated, a conventional electromechanical velocity integrator responsive to said input voltage for providing a shaft output rotational velocity operating in a range where the relationship between said input voltage and said output shaft rotational velocity is linear over a selected operating range, a mechanical differential with one shaft input connected to the output shaft of said conventional electromechanical integrator, means responsive to said input voltage for detecting that the input voltage commensurate with the velocity to be integrated has exceeded the selected operating range of said conventional electromechanical integrator both for providing a known constant shaft rotational velocity to the other input of said mechanical differential and for modifying said input voltage to said conventional electromechanical integrator by an amount commensurate with said known constant shaft rotational velocity input, and utilization means connected to the output of said mechanical differential.

2. An electromechanical integrator means, as set forth in claim 1, wherein said conventional electromechanical velocity integrator comprises a summing amplifier means, an output electromechanical drive means responsive to said summing amplifier for providing a shaft velocity commensurate with the input voltage of said summing amplifier, and an electrical tachometer connected to said electromechanical drive means for providing a voltage commensurate with said shaft output velocity for modifying the input of said summing feedback amplifier so that the relationship between the input voltage to said summing amplifier and said shaft output velocity is linear.

3. An electromechanical integrator means, as set forth in claim 1, wherein said means responsive to said input voltage for detecting that the input velocity has exceeded the selected operating range of said conventional electromechanical integrator for providing a known constant shaft velocity input to said mechanical differential and for modifying said input voltage to said conventional electromechanical intergator by an amount commensurate with said known constant shaft velocity comprises a constant shaft velocity drive means, electromechanical clutching and shaft velocity reduction means for selectively providing plural constant shaft velocity outputs, a voltage source for selectively providing plural constant compensating voltages corresponding to said selective plural constant shaft velocity output of said electromechanical clutch and shaft velocity reduction means, and electromechanical switching means responsive to said input voltage commensurate with velocity for detecting a shaft velocity outside the selected operating range of said conventional electromechanical integrator and actuating said compensating means and said electromechanical clutching and shaft velocity reduction means.

4. An electromechanical integrating means, as set forth in claim 3, wherein said constant shaft velocity drive means comprises a synchronous motor and a controlled frequency power supply for driving said motor at a fixed velocity.

5. An electromechanical integrating means, as set forth in claim 3, wherein said electromechanical switching means responsive to said input voltage comprises a shaft, a servo shaft position means, plural cams mounted on said shaft, and plural switching means, each positioned to co-operate with one of said plural cams so as to actuate said voltage compensating means and said electromechanical clutching and shaft velocity reduction means.

6. An electromechanical integrator reversibly operable over a wide range of output shaft rotational velocities comprising a source of a reversible input voltage commensurate with the velocity to be integrated, a reversible conventional electromechanical velocity integrator responsive to said input volatge operating in a selected operating range where the relationship between input voltage and output shaft velocity is linear, a mechanical differential having two shaft inputs and one shaft output, one input of said differential being connected to the output shaft of said conventional electromechanical integrator, a reversible plural step electromechanical drive means connected to the other input of said mechanical differential, utilization means connected to the mechanical output of said differential, means responsive to said input voltage for detecting that the input velocity is passing outside the selected operating range of said conventional electromechanical integrator both for actuating said reversible plural step drive means so as to provide a constant shaft velocity input to said mechanical differential and for modifying the voltage input to said conventional integrator by an amount commensurate with the shaft velocity contribution made by said reversible plural step drive means.

7. The electromechanical integration means, as set forth in claim 6, wherein said reversible conventional electromechanical velocity integrator comprises a summing feedback amplifier means, an electromechanical drive means responsive to said summing feedback amplifier for driving an output shaft at a velocity commensurate with the input voltage, said summing amplifier and an electrical tachometer connected to said electromechanical drive means for providing a voltage commensurate with the rotational velocity of said output shaft for modifying the input voltage to said summing feedback amplifier so that the relationship between said input voltage and the rotational velociy of said output shaft is linear.

8. The electromechanical integrator means, as set forth in claim 6, wherein said means responsive to said input voltage for detecting that the input velocity is passing outside the selected operating range of said conventional electromechanical integrator both for actuating said reversible plural step drive means and for modifying the voltage input to said conventional integrator comprises a reversible constant shaft velocity drive means, an electrical mechanical clutching and shaft velocity reduction means driven by said constant shaft velocity drive means for providing reversible selective plural shaft rotational velocity outputs, a voltage source for providing selective plural constant compensating voltages one corresponding to each of said reversible selective plural constant shaft velocity outputs, and reversible electromechanical switching means responsive to said reversible input voltage commensurate with the velocity to be integrated both for detecting when the shaft velocity is outside the selected operating range of said conventional electromechanical integrator and for actuating said voltage compensating means and said electromechanical clutching and shaft reduction means.

9. An electromechanical integrator means operable over a wide range of output shaft rotational velocities comprising a source of an input voltage commensurate with the velocity to be integrated, a conventional electromechanical feedback velocity integrator responsive to said input voltage operating in a selected operating range where the relationship between input voltage and output shaft velocity is linear, a mechanical differential having two shaft inputs and one shaft output connected to receive one input from the output shaft of said conventional electromechanical integrator, a plural step electrical mechanical drive means connected to the other input to said mechanical differential, utilization means connected to the mechanical output of said differential, means responsive to said input voltage for detecting that the input velocity is passing outside the selected operating range of said conventional electromechanical integrator both for actuating said plural step drive means so as to provide a constant shaft velocity input to said mechanical differential and for modifying the voltage input to said conventional electromechanical integrator by an amount commensurate with the shaft velocity contribution made by said plural step drive means so that said conventional electromechanical integrator operates on the linear portion of said relationship between its input and output.

10. An electromechanical integrating means operable over a wide range of output shaft rotational velocities comprising means for providing an input voltage commensurate with the instantaneous input velocity to be integrated, a conventional electromechanical velocity integrator responsive to said input voltage for providing a shaft output operating in a selected range where the relationship between said input voltage and said output shaft rotational velocity is linear, a mechanical differential having two input and one output shafts with one input connected to the output shaft of said conventional electromechanical integrator, means responsive to said input voltage for detecting that the input voltage commensurate with the velocity to be integrated has exceeded the selected operating range of said conventional electromechanical integrator, means responsive to said detecting means for providing a known constant shaft rotational velocity to the other input of said mechanical differential, means responsive to said detection means for modifying said input voltage to said conventional electromechanical integrator by an amount commensurate with said known constant shaft rotational velocity input, and utilization means connected to the output of said mechanical differential.

11. An electromechanical integrating means, as set forth in claim 10, wherein said means for detecting that the input voltage commensurate with the velocity to be integrated has exceeded the selected range of the conventional electromechanical integrator comprises a conventional electromechanical position servo for providing a shaft output commensurate with said input voltage representing the instantaneous velocity to be integrated, plural cams mounted on said output shaft, plural switching means each positioned to co-operate with one of said plural cams for detecting when said input voltage successively passes through the selected operating range of said conventional electromechanical integrator.

12. An electromechanical integrator means, as set forth in claim 11, wherein said means for providing a known constant shaft rotational velocity to the other input of said mechanical integrator comprises a constant shaft velocity drive means, electromechanical clutching means and shaft velocity reduction means for selectively providing plural constant shaft velocity outputs in accordance with the condition of said plural switching means each positioned to be actuated by one of said plural cams.

13. An electromechanical integrating means, as set forth in claim 12, wherein said means for modifying said input voltage to said conventional electromechanical integrator by an amount commensurate with said known constant shaft rotational velocity input comprises a transformer with a plural tapped output winding, switching means responsive to the condition of said plural switching means, each positioned to co-operate with one of said plural cams so as to provide a compensating voltage commensurate with said known constant shaft rotational velocity integrator.

14. An electromechanical integrator means operable over a wide range of output shaft rotational velocities comprising an output shaft, a mechanical differential connected to drive said output shaft, means for providing an input voltage commensurate with the instantaneous velocity to be integrated, a conventional electromechanical velocity integrator for providing a shaft input to said mechanical differential, electromechanical shaft drive means for selectively applying one of plural known constant shaft rotational velocities to another input of said differential in a manner so that even through said input voltage commensurate with an instantaneous velocity to be integrated is outside the selected operating range of said conventional electromechanical integrator said conventional integrator remains within its selected operating range and said output shaft is maintained at a rotational velocity commensurate with said input voltage.

15. An electromechanical integrator means operable over a wide range of output shaft rotational velocities and adapted to receive an input voltage commensurate with the instantaneous velocity to be integrated comprising an output shaft, a mechanical differential connected to drive said output shaft, a conventional electromechanical velocity integrator for providing a shaft input to said mechanical differential, additional electromechanical shaft drive means for selectively applying one of plural known constant shaft rotational velocities to another input of said differential in a manner so that even though said input voltage commensurate with an instantaneous velocity to be integrated is outside the selected operating range of said conventional electromechanical integrator said conventional integrator remains within its selected operating range and said output shaft is maintained at a rotational velocity commensurate with said input voltage.

16. An electromechanical integrator means operable over a wide range of output shaft rotational velocities and adapted to receive an input voltage commensurate with the instantaneous velocity to be integrated comprising an output shaft, a mechanical differential connected to drive said output shaft, a conventional electromechanical velocity integrator for providing a shaft input to said mechanical differential, additional electromechanical shaft drive means for selectively applying a known constant shaft rotational velocity to the other input of said differential in a manner so that even though said input voltage commensurate with an instantaneous velocity to be integrated is outside the selected operating range of said conventional electromechanical integrator said conventional integrator remains within its selected operating range and said output shaft is maintained at a rotational velocity commensurate with said input voltage.

17. An electromechanical integrating means operable over a wide range of shaft output rotational velocities and adapted to receive an input voltage commensurate with the instantaneous velocity to be integrated comprising a conventional electromechanical velocity integrator responsive to said input voltage for providing a shaft output operating in a selected range wherein a relationship between its input voltage and its output shaft rotational velocity is linear, a mechanical differential having two input and one output shafts with one input connected to the output shaft of said conventional electromechanical integrator, means responsive to said input voltage for detecting that the input voltage commensurate with the velocity to be integrated has exceeded the selected operating range of said conventional electromechanical integrator, means responsive to said detecting means for providing a known constant shaft rotational velocity to the other input of said mechanical differential, means responsive to said detection means for modifying said input voltage to said conventional electromechanical integrator by an amount commensurate with said known constant shaft rotational velocity input and utilization means connected to the output of said mechanical differential.

18. An electromechanical integrating means operable over a wide range of shaft output rotational velocities and adapted to receive an input voltage commensurate with the instantaneous velocity to be integrated comprising a conventional electromechanical velocity integrator responsive to said input voltage for providing a shaft output operating in a selected range wherein a relationship between its input voltage and its output shaft rotational velocity is linear, a mechanical differential having two input and one output shafts with one input connected to the output shaft of said conventional electromechanical integrator, means responsive to said input voltage for detecting that the input voltage commensurate with the velocity to be integrated has exceeded the selected range of said conventional electromechanical integrator, means responsive to said detecting means for providing a known constant shaft rotational velocity to the other input of said mechanical differential, means responsive to said detection means for modifying said input voltage to said conventional electromechanical integrator by an amount commensurate with said known constant shaft rotational velocity input.

No references cited.